US012620500B2

(12) United States Patent
Nanda

(10) Patent No.: US 12,620,500 B2
(45) Date of Patent: May 5, 2026

(54) CLADDING AND ASSEMBLY FOR NUCLEAR APPLICATIONS

(71) Applicant: Rolls-Royce High Temperature Composites Inc., Cypress, CA (US)

(72) Inventor: Sujit Nanda, Cypress, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 318 days.

(21) Appl. No.: 18/213,541

(22) Filed: Jun. 23, 2023

(65) Prior Publication Data

US 2025/0226123 A1 Jul. 10, 2025

(51) Int. Cl.
*G21C 3/07* (2006.01)
*G21C 21/02* (2006.01)

(52) U.S. Cl.
CPC ............... *G21C 21/02* (2013.01); *G21C 3/07* (2013.01)

(58) Field of Classification Search
CPC ........................................................ G21C 3/28
See application file for complete search history.

(56) References Cited

U.S. PATENT DOCUMENTS 2,902,422 A * 9/1959 Hutter ...................... G21C 3/34 376/454
2,941,933 A * 6/1960 Roake .................... G21C 21/02 376/454
2,983,663 A * 5/1961 Bassett .................... G21C 3/16 376/419
2,986,509 A * 5/1961 Duffy, Jr. ................. G21C 3/32 376/454
3,030,291 A * 4/1962 Butler ...................... G21C 3/12 376/454
3,096,264 A * 7/1963 Bauer ...................... G21C 3/33 228/147
3,414,475 A * 12/1968 Fiebelmann ........... G21C 15/02 976/DIG. 188
4,324,618 A * 4/1982 Schluderberg ......... G21C 3/338 376/454
4,522,781 A * 6/1985 Schluderberg ......... G21C 3/336 376/454
4,800,061 A * 1/1989 Shallenberger ........ G21C 3/334 29/723

(Continued)

FOREIGN PATENT DOCUMENTS

DE 2417326 A1 * 10/1975
DE 19834041 A1 * 2/2000 ............... G21C 3/08
KR 20130117124 A * 10/2013 ............... G21C 3/07

OTHER PUBLICATIONS

Liu et al., "Recent Advances in Joining of SiC-based Materials (monolithic SiC and $SiC_f$/SiC composites): Joining Processes, Joint Strength, and Interfacial Behavior," Journal of Advanced Ceramics, 8(1) (2019) pp. 19-38.

*Primary Examiner* — Lily C Garner
(74) *Attorney, Agent, or Firm* — Shumaker & Sieffert, P.A.

(57) ABSTRACT

An assembly for nuclear applications includes a tubular cladding for containing nuclear fuel. The tubular cladding comprises a ceramic matrix composite. An assembly tube surrounds the tubular cladding, and a collar is positioned between the tubular cladding and the assembly tube. The collar extends circumferentially around the cladding and comprises the ceramic matrix composite. The tubular cladding may be centered within the assembly tube by the collar.

8 Claims, 6 Drawing Sheets

(56) References Cited

U.S. PATENT DOCUMENTS

| | | | | |
|---|---|---|---|---|
| 9,514,851 | B2 * | 12/2016 | Carrilho | G21C 3/08 |
| 9,548,139 | B2 * | 1/2017 | Zabiego | C04B 37/021 |
| 10,037,823 | B2 * | 7/2018 | Bashkirtsev | G21C 3/322 |
| 10,720,244 | B2 * | 7/2020 | Derunov | G21C 3/08 |
| 11,560,799 | B1 * | 1/2023 | Harris | F01D 9/041 |
| 11,996,206 | B2 * | 5/2024 | Petrie | G21C 3/08 |
| 12,180,122 | B2 * | 12/2024 | Sellappan | C04B 35/565 |
| 12,278,017 | B2 * | 4/2025 | Lahoda | C23C 4/131 |
| 12,417,853 | B2 * | 9/2025 | Deck | F28F 21/04 |
| 2006/0039524 | A1 * | 2/2006 | Feinroth | C04B 35/62897 376/409 |
| 2011/0170653 | A1 * | 7/2011 | Cabrero | C04B 35/62897 376/416 |
| 2012/0087457 | A1 * | 4/2012 | Garnier | C04B 35/573 376/416 |
| 2014/0270047 | A1 * | 9/2014 | Carrilho | G21C 3/08 376/451 |
| 2017/0059165 | A1 * | 3/2017 | Nanda | F23R 3/48 |
| 2018/0286523 | A1 * | 10/2018 | Forstman | G21C 3/12 |
| 2019/0088376 | A1 * | 3/2019 | Lahoda | G21C 3/047 |
| 2020/0027580 | A1 * | 1/2020 | Deck | F28D 7/1653 |
| 2020/0161010 | A1 * | 5/2020 | Lahoda | C23C 14/0682 |
| 2020/0182472 | A1 * | 6/2020 | Nanda | F23R 3/48 |
| 2021/0005334 | A1 * | 1/2021 | Long | G21C 3/38 |
| 2021/0202122 | A1 * | 7/2021 | Inman | G21C 3/18 |
| 2022/0130558 | A1 * | 4/2022 | Zhang | G21C 3/17 |
| 2023/0132157 | A1 * | 4/2023 | Olson | G21C 3/42 376/424 |
| 2023/0192564 | A1 * | 6/2023 | Sellappan | C04B 37/005 156/89.11 |
| 2024/0182368 | A1 * | 6/2024 | Hays | B33Y 40/20 |
| 2024/0425422 | A1 * | 12/2024 | Nanda | C04B 35/573 |

* cited by examiner

CLADDING AND ASSEMBLY FOR NUCLEAR APPLICATIONS

TECHNICAL FIELD

The present disclosure relates generally to claddings for nuclear applications and more particularly to claddings based on ceramic matrix composites.

BACKGROUND

Ceramic matrix composites, which include ceramic fibers embedded in a ceramic matrix, exhibit a combination of properties that make them promising candidates for industrial applications that demand excellent thermal and mechanical properties along with low weight. A ceramic matrix composite that includes a matrix comprising silicon carbide reinforced with silicon carbide fibers may be referred to as a silicon carbide/silicon carbide composite or SiC/SiC composite. Fabrication of a SiC/SiC composite may include slurry and melt infiltration steps to densify a silicon carbide fiber preform.

Accident tolerant fuel (ATF) assemblies refer to cladding and fuel pellet designs for nuclear reactors that are being developed to provide performance, safety and economic advantages over current nuclear cladding and fuels. Besides land-based nuclear reactors, ATF assemblies may have mobile and space applications, such as in nuclear thermal propulsion (NTP) systems being developed for rockets used in deep space missions, and bimodal nuclear thermal propulsion/nuclear electric propulsion (NTP/NEP) systems that use nuclear reactors to provide both heat and electricity to generate thrust. Existing ATF assemblies based on metal claddings have temperature and other limitations that warrant development of new cladding materials and components.

BRIEF DESCRIPTION OF THE DRAWINGS

The embodiments may be better understood with reference to the following drawing(s) and description. The components in the figures are not necessarily to scale. Moreover, in the figures, like-referenced numerals designate corresponding parts throughout the different views.

DETAILED DESCRIPTION

Figure 1:
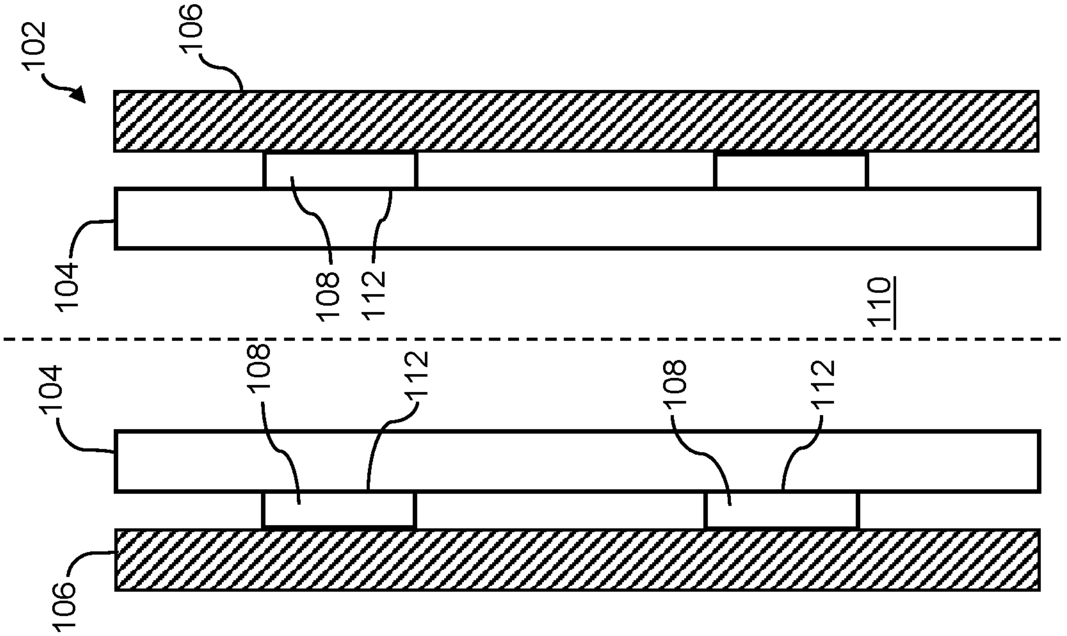
FIG. 1 shows a cross-sectional view of an exemplary assembly for nuclear applications, where the assembly includes a tubular cladding centered within an assembly tube by collars bonded to the tubular cladding.

FIG. 1 shows an assembly for nuclear applications that may in some examples be referred to as an accident tolerant fuel (ATF) assembly. The assembly 102 includes a tubular cladding 104 for containing nuclear fuel. More particularly, the tubular cladding 104 includes a channel 110 sized to contain one or more nuclear fuel pellets. The tubular cladding 104 comprises a ceramic matrix composite. An assembly tube 106 surrounds the tubular cladding 104, and a collar 108 is positioned between the tubular cladding 104 and the assembly tube 106. The collar 108 extends circumferentially around the cladding 104 and also comprises a ceramic matrix composite.

Figure 2:
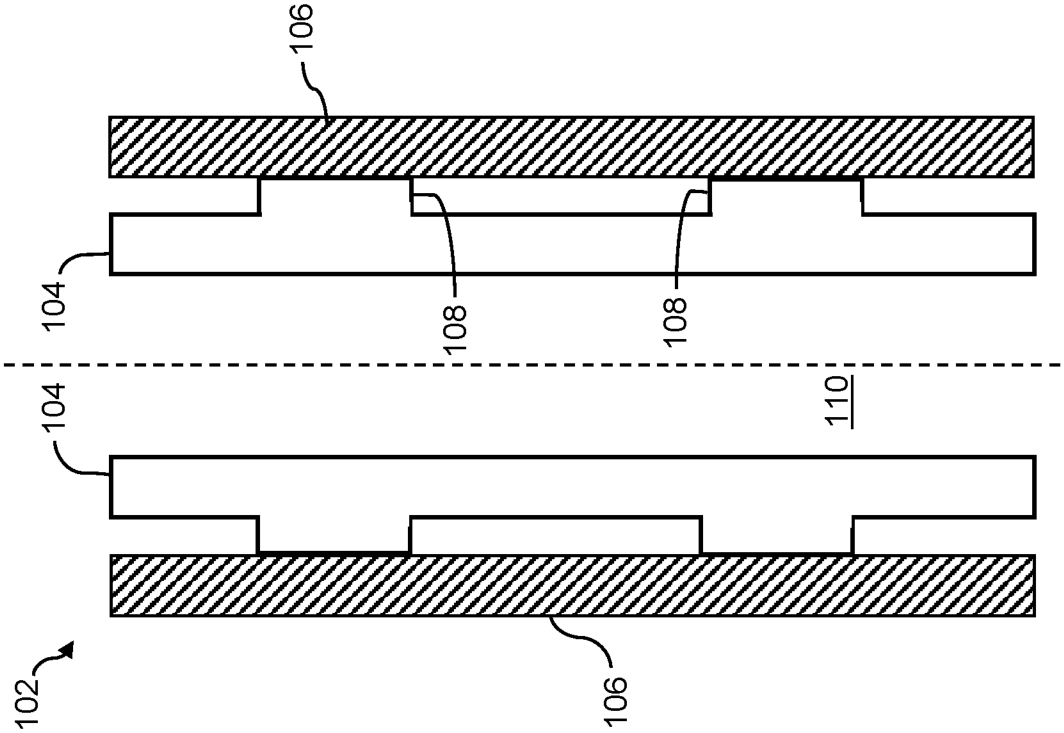
FIG. 2 shows a cross-sectional view of an exemplary assembly for nuclear applications, where the assembly includes a tubular cladding centered within an assembly tube by collars integrally formed with the tubular cladding.

The collar 108 may function to provide standoff support for the tubular cladding 104 within the assembly tube 106, which may comprise a metal alloy, a ceramic, or another suitable material. In particular, the tubular cladding 104 may be centered within the assembly tube 106 by the collar 108. Accordingly, the collar 108 and the tubular cladding 104 may have a concentric arrangement with each other and with respect to the assembly tube 106. The dotted lines in FIGS. 1 and 2 show for each assembly 102 the central longitudinal axis.

The collar 108 may be bonded to the tubular cladding 104 as illustrated in FIG. 1. Alternatively, the collar 108 may be integrally formed with the tubular cladding 104, as shown in FIG. 2. In other words, in the example of FIG. 1, the tubular cladding 104 and the collar 108 may have a bonded multi-piece structure including bonded joints or interfaces 112, or, as shown in FIG. 2, the tubular cladding 104 and the collar 108 may have a monolithic structure. The bonded joints or interfaces 112 between the collar 108 and the tubular cladding 104 may be formed by sintering of a particulate bond material, in one example. Processing of the tubular cladding 104 and the collar 108 to form the bonded and monolithic structures is described below.

The assembly 102 may include a plurality of the collars 108 spaced longitudinally apart along the tubular cladding 104, as illustrated. In the examples of FIGS. 1 and 2, each assembly 102 includes two collars 108. Depending on the length of the tubular cladding 104 and the assembly tube 106, the assembly 102 may include from two to ten collars 108, or more. In this disclosure, a reference to the "collar 108" may be understood to apply to any or all collars 108 integrated with (e.g., bonded to or integrally formed with) the tubular cladding 104.

Figure 3:
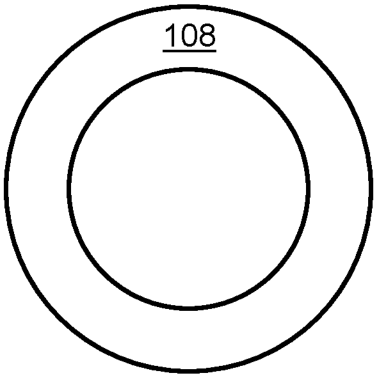
FIG. 3 shows a top-view schematic of an exemplary collar configured to extend completely around the circumference of the tubular cladding.
Figure 4A:
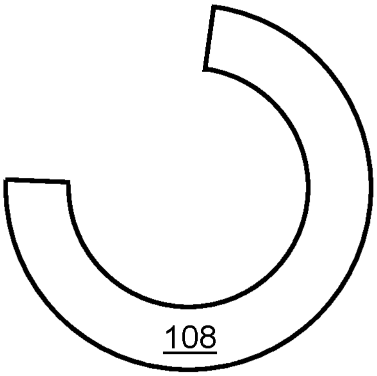
FIGS. 4A and 4B show top-view schematics of exemplary collars configured to extend partway around the circumference of the tubular cladding.
Figure 4B:
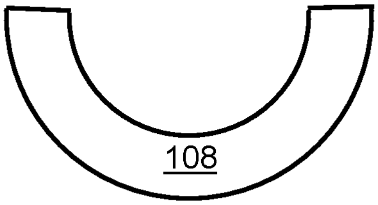
Figure 4C:
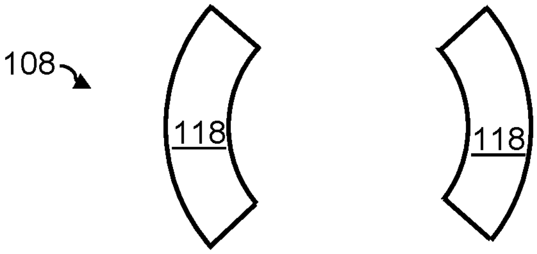
FIG. 4C shows an exemplary collar configured to be positioned about the circumference of the tubular cladding that includes separate collar sections.

The collar 108 may extend completely around the circumference of the tubular cladding 104, as shown for example in FIG. 3, where the collar 108 has a ring shape. Alternatively, the collar 108 may extend only partially around the circumference of the tubular cladding 104, as shown in FIGS. 4A and 4B. For example, the total circumferential extent of the collar 108 may be in the range from 180° to 360°, or from 180° to 240°. The circumferential extent of the collar 108 is preferably large enough to securely center the tubular cladding 104 within the larger assembly tube 106. Also or alternatively, the collar 108 may comprise a plurality of collar sections 118 positioned about the circumference, as illustrated in FIG. 4C, to provide the desired stability. For example, there may be two or more collar sections 118, three or more collar sections 118, and/or up to six collar sections 118. As illustrated, the collar sections 118 may have a symmetric arrangement about the circumference. The thickness of the collar 108 is typically in a range from about 0.5 mm (~0.02 in) to about 5 mm (~0.2 in) to provide the desired standoff support. Each collar 108 may have an outer radius in a range from about 5 mm (~0.2 in) to about 21 mm (~0.8 in).

Figure 5A:
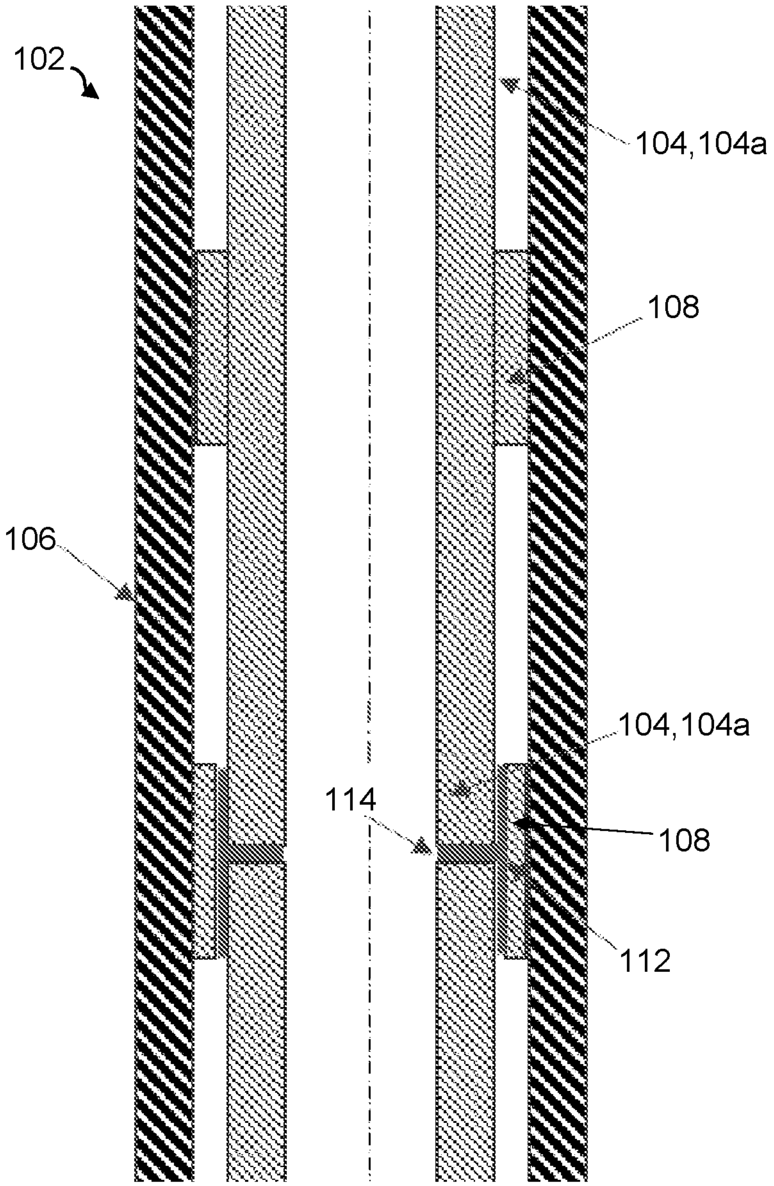
FIG. 5A shows a cross-sectional view of a portion of an exemplary assembly that includes a tubular cladding having a multi-piece structure.
Figure 5B:
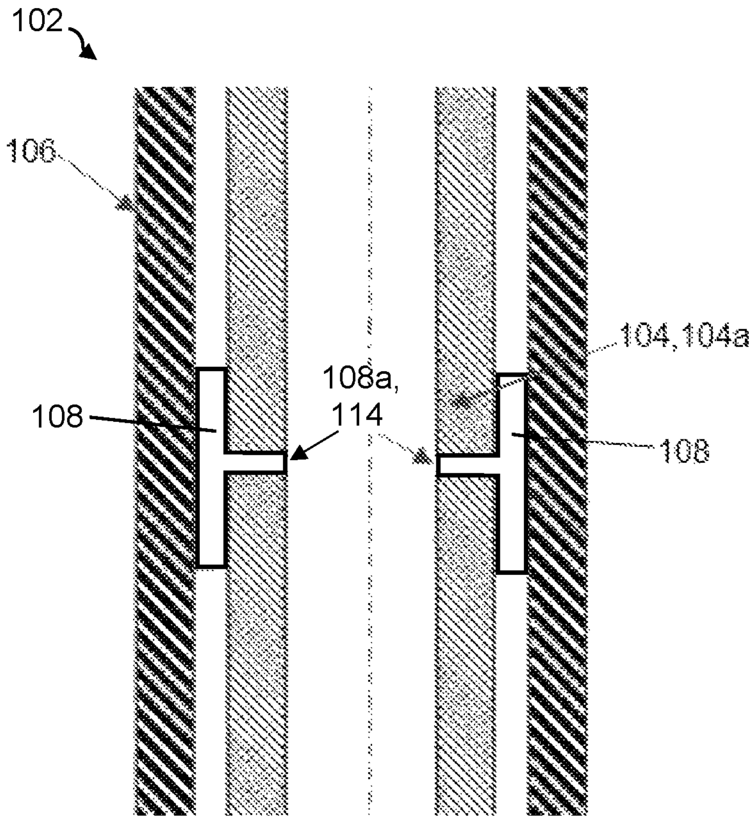
FIG. 5B shows a cross-sectional view of a portion of an exemplary assembly that includes a tubular cladding having a multi-piece structure.

In some examples, the tubular cladding 104 may have a total length in a range from about 15 cm (~6 in) to about 152 cm (~60 in), and thus it may be advantageous to form the cladding 104 as a multi-piece structure. Referring to FIGS. 5A and 5B, the tubular cladding 104 may be fabricated from a plurality of cladding tubes 104*a* positioned end-to-end and bonded together. In such a situation, the assembly 102 may also include a plurality of collars 108, where each collar 108 is positioned adjacent to a joint 114 between cladding tubes 104*a*. As illustrated in FIG. 5A, each collar 108 may be bonded to a region of the tubular cladding 104 containing one of the joints 114 to provide additional support and structural integrity for the tubular cladding 104. The joints 114 between the adjacent cladding tubes 104*a* may be formed by sintering a particulate bond material, as described below. As shown in FIG. 5B, each collar 108 may further include one or more radially-inward projecting extensions 108*a* positioned within the (respective) joint 114.

The ceramic matrix composite (CMC) that forms part or all of the tubular cladding 104 and the collar 108 may include a ceramic matrix comprising silicon carbide and ceramic fibers comprising silicon carbide. In some examples, the ceramic matrix may also or alternatively comprise silicon oxycarbide, silicon nitride, alumina, aluminosilicate, and/or boron carbide or another refractory carbide. Similarly, in some examples, the ceramic fibers may also or alternatively comprise silicon nitride, alumina, aluminosilicate, or carbon. The fibers may be continuous or chopped fibers. Compared to the metal alloys employed for conventional claddings, ceramic matrix composites have improved high temperature properties and chemical stability. The collar 108 and the tubular cladding 104 comprising the ceramic matrix composite may be prepared separately using CMC fabrication methods known in the art and then bonded together, as described below. Alternatively, the collar 108 and the tubular cladding 104 may be integrally formed during CMC densification, also as described below.

The tubular cladding 104 and the collar 108 may comprise the same ceramic matrix composite, that is, a ceramic matrix composite having the same ceramic matrix, e.g., in terms of composition, and the same ceramic fibers, e.g., in terms of composition and fiber type/size (e.g., continuous versus chopped fibers). Alternatively, the tubular cladding 104 and the collar 108 may comprise different ceramic matrix composites. For example, the different ceramic matrix composites may have the same ceramic matrix but different ceramic fibers, where the ceramic fibers may differ in composition (e.g., silicon carbide or carbon) and/or in fiber type/size (e.g., continuous silicon carbide fibers versus chopped silicon carbide fibers). In another example, the different ceramic matrix composites may have different ceramic matrices but the same ceramic fibers. In yet another example, the different ceramic matrix composites may have different ceramic matrices and different ceramic fibers.

Before methods of manufacturing a cladding or assembly for nuclear applications are discussed, typical methods to prepare ceramic matrix composites are described. First, a fiber preform may be fabricated. In one example, woven plies comprising ceramic fibers arranged in tows may be laid up in a desired three-dimensional geometry to form the fiber preform. Alternatively, tows of the ceramic fibers may undergo a braiding process over a rotating mandrel to fabricate the fiber preform, particularly for tubular shapes. Before or after the fiber preform is formed, an interface coating may be deposited on the tows/ceramic fibers, typically by chemical vapor infiltration (CVI), to provide a weak fiber-matrix interface in the densified CMC, which can be beneficial for fracture toughness in use. The interface coating may include one or more layers comprising boron nitride and/or silicon-doped boron nitride. The fiber preform may be rigidized by depositing a matrix material such as silicon carbide on the fiber preform via CVI or another deposition method known in the art. In a typical CVI process, gaseous precursors are infiltrated into the fiber preform and solid reaction products deposit on exposed surfaces, forming a coating comprising the matrix material. Deposition of the matrix material normally occurs after deposition of the interface coating. The rigidized fiber preform may be infiltrated with a slurry comprising ceramic particles and optionally reactive elements/particles to form an impregnated fiber preform or "green body," i.e., a fiber preform loaded with particulate matter. Typically, the impregnated fiber preform comprises a loading level of particulate matter from about 40 vol. % to about 60 vol. %, with the remainder being porosity. Slurry infiltration may be followed by melt infiltration of the fiber preform with a molten material comprising silicon, followed by cooling, thereby forming a densified ceramic matrix composite. During melt infiltration, the molten material flows through interstices of the fiber preform and reacts with any reactive elements (e.g., carbon) in the flow path. Upon cooling, a ceramic matrix is formed from the ceramic reaction products and any ceramic phases (e.g., SiC particles) present in the fiber preform prior to melt infiltration. In some cases, substantially complete densification may be achieved by CVI of the matrix material, and the further steps of slurry infiltration and/or melt infiltration may not be required.

Figure 6:
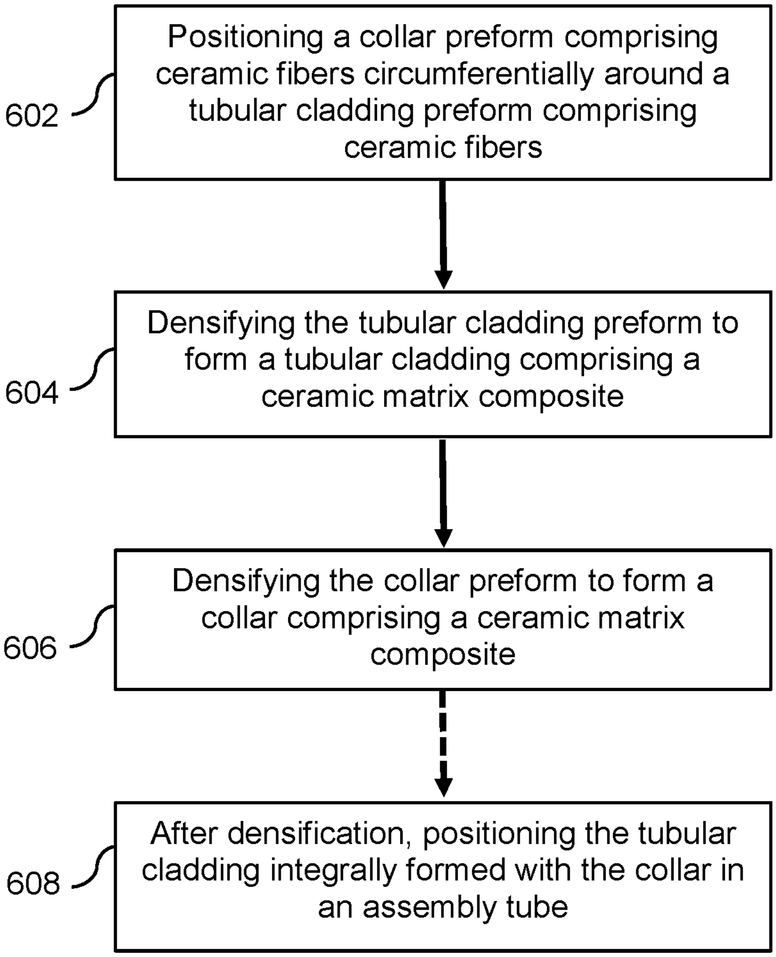
FIG. 6 shows a flow chart of a method of manufacturing a cladding and optionally an assembly for nuclear applications.

Referring now to the flow chart of FIG. 6, a method of manufacturing a cladding for nuclear applications may include positioning 602 a collar preform comprising ceramic fibers circumferentially about (or circumferentially around) a tubular cladding preform comprising ceramic fibers. It is understood that the collar preform constitutes a fiber preform as described above formed in the shape of the desired collar, and a tubular cladding preform constitutes a fiber preform as described above formed in the shape of the desired tubular cladding. The method further includes densifying 604 the tubular cladding preform to form a tubular cladding comprising a ceramic matrix composite, and densifying 606 the collar preform to form a collar comprising the ceramic matrix composite. Densification of the tubular cladding and the collar may occur in parallel (simultaneously or near-simultaneously) or serially (one after the other), and the tubular cladding may thus be integrally formed with the collar upon densification.

As described above, densification may comprise slurry infiltration of the collar and cladding preforms, followed by melt infiltration of the collar and cladding preforms. Also or alternatively, densification may comprise chemical vapor infiltration of the collar and cladding preforms. The ceramic matrix composite formed upon densification may include a ceramic matrix (e.g., comprising silicon carbide) and ceramic fibers (e.g., comprising silicon carbide) embedded in the ceramic matrix. As described above, the tubular cladding may be integrally formed with multiple collars, and/or the tubular cladding itself may in some examples have a multi-piece structure comprising multiple cladding tubes.

After densification 604,606, the tubular cladding integrally formed with the collar may be positioned 608 in an assembly tube. More specifically, the tubular cladding may be centered within the assembly tube as a result of the standoff or centering provided by the collar(s).

Figure 7:
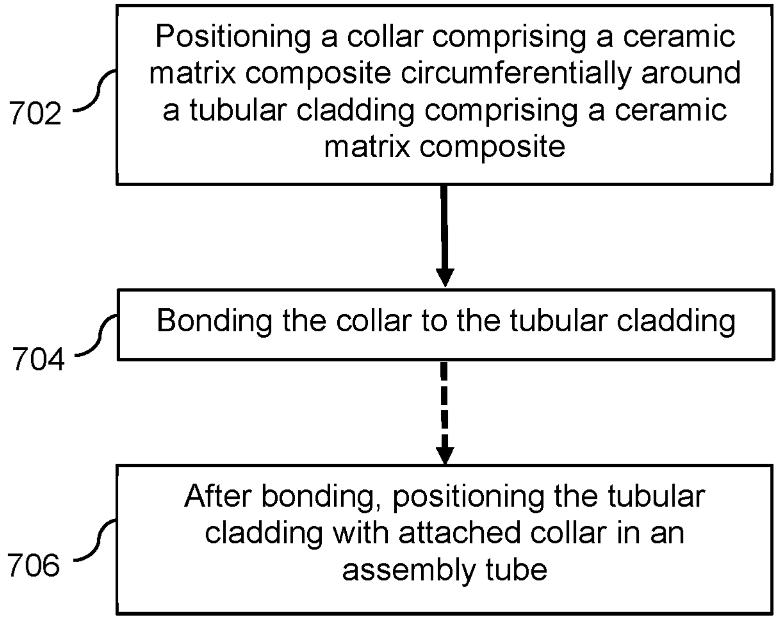
FIG. 7 shows a flow chart of another method of manufacturing a cladding and optionally an assembly for nuclear applications.

Referring now to the flow chart of FIG. 7, the method of manufacturing a cladding for nuclear applications may include positioning 702 a collar comprising a ceramic matrix composite circumferentially about a tubular cladding comprising the ceramic matrix composite, and bonding 704 the collar to the tubular cladding. In some examples, a plurality of the collars may be positioned circumferentially around the tubular cladding and then bonded to the tubular cladding. The bonding may comprise reaction bonding, which may utilize a particle-based slurry that undergoes sintering to form the bond or the bonded joint, as described below. Alternatively, the bonding may be carried out using another suitable method for joining ceramic matrix composites. Prior to bonding, the collar(s) and tubular cladding may be formed using methods of fabricating ceramic matrix composites known in the art, as described above, where the ceramic matrix composite may include a ceramic matrix (e.g., comprising silicon carbide) and ceramic fibers (e.g., comprising silicon carbide) embedded in the ceramic matrix.

In examples where the tubular cladding has a multi-piece structure comprising a plurality of cladding tubes positioned end-to-end, the method may further comprise bonding the cladding tubes together, either before the collar is bonded to the tubular cladding, or while the collar is being bonded to the tubular cladding. As with bonding the collar to the tubular cladding, bonding of the cladding tubes may be carried out using reaction bonding or another suitable method for joining ceramic matrix composites. In this example, a plurality of collars may be used and spaced longitudinally apart at joints between adjacent cladding tubes, and the collars may be bonded to the tubular cladding at the joints. As described above and shown in FIG. 5B, in some examples, the collars may include one or more radially-inward projecting extensions positioned within the respective joint.

After bonding, the tubular cladding with attached collar(s) may be positioned 706 in an assembly tube. More specifically, the tubular cladding may be centered within the assembly tube as a result of the standoff or centering provided by the collar(s).

The reaction bonding process referred to above may utilize a slurry composition for joining. The slurry composition may include a carrier liquid (e.g., water or another solvent) and solid particles in the carrier liquid. The solid particles may include, for example, reactive additive particles such as yttria and/or alumina particles, in combination with silicon carbide particles. To carry out the bonding process, a layer of the slurry composition may be formed between the components to be joined (e.g., between cladding tubes positioned end-to-end, and/or between the collar (s) and the tubular cladding). The layer may be heated to remove the carrier liquid and sinter the particles to form the bonded joint, which may comprise silicon carbide and other materials, depending on the composition of any reactive additive particles included in the slurry. The particles of the slurry composition may be selected such that the bonded joint may be formed at a suitable processing temperature without the need for application of an external pressure or other force during heating. The reactive additive particles may be present in an amount from about 5 vol. % to about 15 vol. % of the total solids content of the slurry. The inclusion of the additive particles may allow for the fusing of the silicon carbide particles to form a joint layer at relatively low temperature and/or pressure, e.g., as compared to a slurry composition that includes only silicon carbide particles. Additional details about the reaction bonding process are provided in U.S. patent application Ser. No. 17/559,277, filed on Dec. 22, 2021, and entitled "Joining Material with Silicon Carbide Particles and Reactive Additives," which is hereby incorporated by reference in its entirety.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to an assembly for nuclear applications, the assembly comprising: a tubular cladding for containing nuclear fuel, the tubular cladding comprising a ceramic matrix composite; an assembly tube surrounding the tubular cladding; a collar disposed between the tubular cladding and the assembly tube, the collar extending circumferentially around the cladding and comprising the ceramic matrix composite.

A second aspect relates to the assembly of the preceding aspect, wherein the tubular cladding is centered within the assembly tube by the collar.

A third aspect relates to the assembly of any preceding aspect, wherein the collar is integrally formed with the tubular cladding.

A fourth aspect relates to the assembly of any preceding aspect, wherein the collar is bonded to the tubular cladding.

A fifth aspect relates to the assembly of any preceding aspect, wherein the collar extends completely around a circumference of the tubular cladding.

A sixth aspect relates to the assembly of any preceding aspect, wherein, the collar extends only partially around a circumference of the tubular cladding A seventh aspect relates to the assembly of any preceding aspect, further comprising a plurality of the collars spaced longitudinally apart along the tubular cladding.

An eighth aspect relates to the assembly of any preceding aspect, wherein the tubular cladding has a multi-piece structure, the tubular cladding comprising a plurality of cladding tubes positioned end-to-end and bonded together.

A ninth aspect relates to the assembly of the preceding aspect, further comprising a plurality of the collars, wherein each collar is positioned at a joint between adjacent cladding tubes.

A tenth aspect relates to the assembly of the preceding aspect, wherein wherein each collar further comprises one or more radially-inward projecting extensions positioned within the respective joint.

An eleventh aspect relates to the assembly of any preceding aspect, wherein wherein the ceramic matrix composite includes: a ceramic matrix comprising silicon carbide; and ceramic fibers comprising silicon carbide embedded in the ceramic matrix.

A twelfth aspect relates to a cladding for nuclear applications, the cladding comprising: a tubular cladding for containing nuclear fuel, the tubular cladding comprising a ceramic matrix composite; a collar extending circumferentially around the tubular cladding and comprising the ceramic matrix composite.

A thirteenth aspect relates to the cladding of the preceding aspect, wherein the collar is configured for centering the tubular cladding within a larger assembly tube.

A fourteenth aspect relates to the cladding of any preceding aspect, wherein the collar is integrally formed with the tubular cladding.

A fifteenth aspect relates to the cladding of any preceding aspect, wherein the collar is bonded to the tubular cladding.

A sixteenth aspect relates to the cladding of any preceding aspect, comprising a plurality of the collars, the collars being spaced longitudinally apart along the tubular cladding.

A seventeenth aspect relates to a method of manufacturing a cladding for nuclear applications, the method comprising: positioning a collar preform comprising ceramic fibers circumferentially about a tubular cladding preform comprising ceramic fibers; densifying the tubular cladding preform to form a tubular cladding comprising a ceramic matrix composite; and densifying the collar preform to form a collar comprising the ceramic matrix composite, wherein the tubular cladding is integrally formed with the collar upon densification.

An eighteenth aspect relates to the method of the preceding aspect wherein the densification comprises chemical vapor infiltration, and/or wherein the densification comprises slurry infiltration followed by melt infiltration.

A nineteenth aspect relates to a method of manufacturing a cladding for nuclear applications, the method comprising: positioning a collar comprising a ceramic matrix composite circumferentially about a tubular cladding comprising the ceramic matrix composite; and bonding the collar to the tubular cladding.

A twentieth aspect relates to the method of the preceding aspect, wherein the bonding comprises reaction bonding.

In addition to the features mentioned in each of the independent aspects enumerated above, some examples may show, alone or in combination, the optional features mentioned in the dependent aspects and/or as disclosed in the description above and shown in the figures.

What is claimed is:

1. An assembly for nuclear applications, the assembly comprising:

a tubular cladding for containing nuclear fuel, the tubular cladding comprising a ceramic matrix composite and a plurality of cladding tubes positioned end-to-end and bonded together;

an assembly tube surrounding the tubular cladding; and a collar disposed between the tubular cladding and the assembly tube, the collar extending circumferentially around the cladding and comprising the ceramic matrix composite, wherein the collar is in contact with the assembly tube and provides a standoff between the tubular cladding and the assembly tube, said standoff resulting in a longitudinal gap extending between the tubular cladding and the assembly tube, wherein the collar is positioned at a joint between ends of at least two cladding tubes of the plurality of cladding tubes, the at least two cladding tubes being positioned end-to-end, and wherein the collar comprises one or more radially-inward projecting extensions positioned within the joint.

2. The assembly of claim 1, wherein the tubular cladding is centered within the assembly tube by the collar.

3. The assembly of claim 1, wherein the collar is integrally formed with the tubular cladding.

4. The assembly of claim 1, wherein the collar is bonded to the tubular cladding.

5. The assembly of claim 1, wherein the collar extends completely around a circumference of the tubular cladding.

6. The assembly of claim 1, wherein the collar extends only partially around a circumference of the tubular cladding.

7. The assembly of claim 1 comprising a plurality of the collars spaced longitudinally apart along the tubular cladding.

8. The assembly of claim 1, wherein the ceramic matric composite includes:

a ceramic matric comprising silicon carbide; and ceramic fibers comprising silicon carbide embedded in the ceramic matrix.

* * * * *